Patented Dec. 12, 1922.

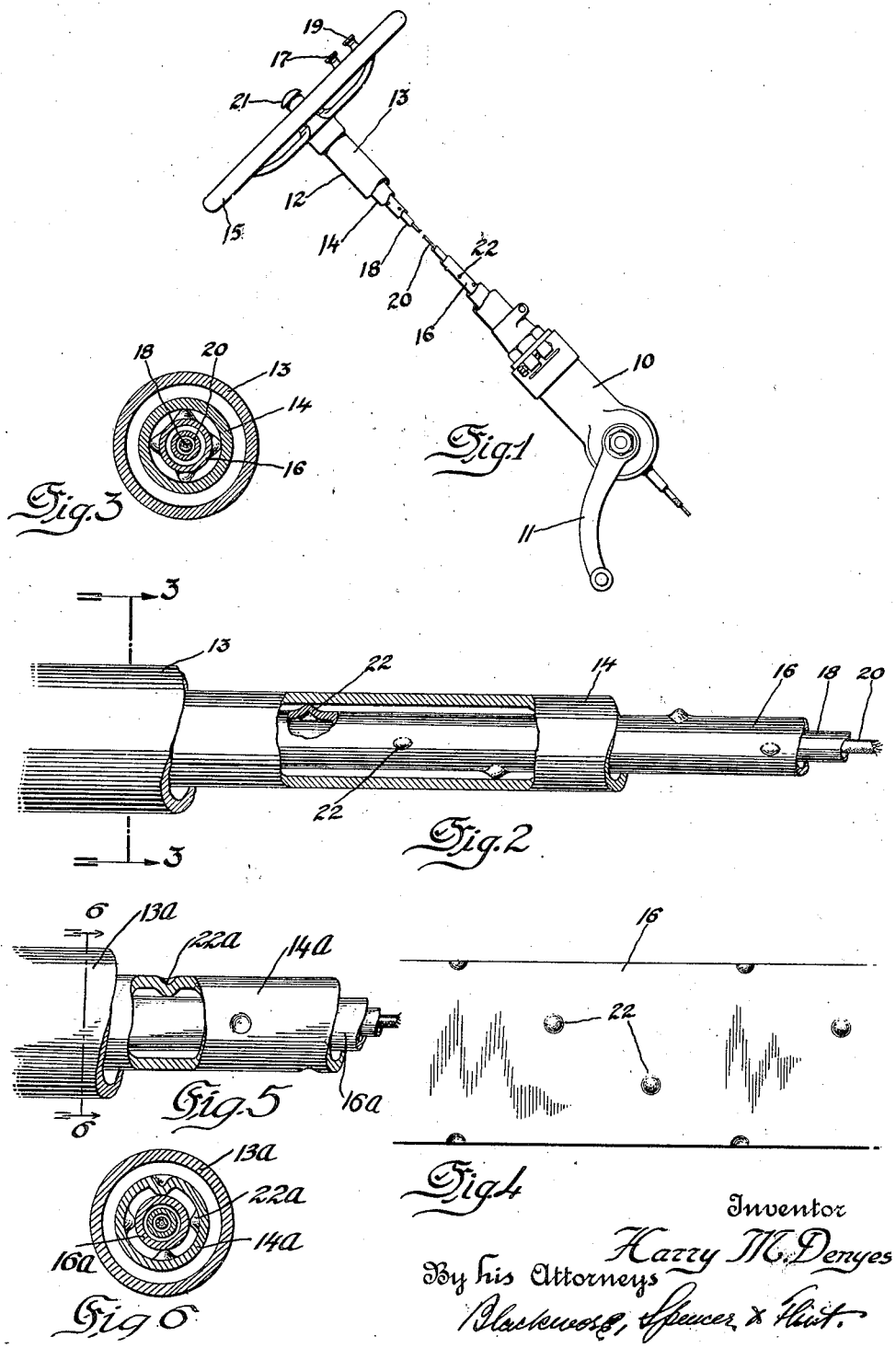

1,438,935

UNITED STATES PATENT OFFICE.

HARRY M. DENYES, OF SAGINAW, MICHIGAN, ASSIGNOR TO GENERAL MOTORS CORPORATION, OF DETROIT, MICHIGAN, A CORPORATION OF DELAWARE.

STEERING-COLUMN ASSEMBLY.

Application filed July 10, 1922. Serial No. 574,030.

*To all whom it may concern:*

Be it known that I, HARRY M. DENYES, a citizen of the United States of America, and a resident of Saginaw, county of Saginaw, and State of Michigan, have invented certain new and useful Improvements in Steering-Column Assemblies, of which the following is a full, clear, concise, and exact description, such as will enable others skilled in the art to which the invention relates to make and use the same, reference being made therein to the accompanying drawings, which form a part of this specification.

This invention relates to motor vehicles and more especially to the steering column assembly thereof.

One of the objects of the invention is the provision of new and improved means for preventing undesirable vibration of the steering post during the operation of the vehicle.

Other and further objects and advantages of the invention will appear from the description and claims when read in connection with the accompanying drawings, in which—

Figure 1 is a side elevation of a portion of a steering post assembly with parts broken away.

Figure 2 is a detailed view on an enlarged scale with parts broken away.

Figure 3 is a section on line 3—3 of Figure 2.

Figure 4 is a developed plan view of the throttle operating shaft.

Figure 5 is a detail view of a modified form of the device.

Figure 6 is a cross section on line 6—6 of Figure 5.

In the operation of motor vehicles the vibration of the steering post, if not prevented, becomes very annoying to the operator especially when the speed of the engine becomes such as to cause its vibrations to synchronize with the natural vibrations of the steering post. It is common practice to provide additional elements such as spring fingers, washers and the like for engaging the steering post at intervals along its length to prevent or materially limit the vibratory movements of said post. But these devices are not entirely noiseless and are more or less troublesome and expensive to manufacture and assemble. I have found that by forming projections on one of the members associated with the steering post for engaging said post that the latter will not only be prevented from vibrating but that the anti-vibrating devices will not interfere in the least with the assembling of the steering column assembly.

On the drawing, the reference character 10 designates a base casting or housing which is adapted to be rigidly secured to the vehicle frame and which contains mechanism for oscillating the steering arm 11 in the usual manner. The housing 10 is adapted to support the steering column assembly 12 in any suitable manner. This assembly may be of any suitable construction. As shown it consists of an outer housing or tubular casing 13 which may be rigidly secured to the housing 10 in the usual manner, and extends rearwardly and upwardly therefrom. A tubular steering shaft 14 is revolubly mounted in the steering column 13. The lower end of the steering shaft 14 is provided with the usual steering wheel 15 while the lower end of said shaft is adapted to be provided with mechanism for oscillating the steering arm 11 in the usual manner.

The throttle and spark lever operating shafts or rods are mounted in the steering column in any suitable manner. For the purpose of illustrating the invention these operating shafts or rods are mounted in the steering shaft and extend the full length thereof. The tubular shaft or rod 16 for operating the throttle lever is mounted in the steering shaft 14 and is concentric therewith. This rod is adapted to be rotated by the lever 17 in the usual manner. Mounted concentrically within the throttle operating rod or shaft is the spark lever operating tubular rod or shaft 18 which is adapted to be rotated by the lever 19 in the usual manner. The assembly may, if desired, be provided with a wire 20 extending axially thereof which is connected to the horn button 21 for making the proper electrical connection for sounding signals. Suitable mechanism is provided on one of the tubes adjacent to the steering shaft for engaging the same to prevent unnecessary vibration of said shaft.

Suitable means are provided for limiting or preventing unnecessary vibration of the steering shaft. These means are adapted to be rigidly secured to or formed on some one of the members of the steering column assembly and is adapted to contact with another one of said members in order to prevent the vibration of the steering shaft. These means may be provided on one of the members adjacent to the steering shaft and are so aranged that they contact the shaft at intervals about the same. As shown in Figures 2 and 3, these means are in the form of projections 22 on the throttle operating shaft 16. These projections are integral with the throttle operating shaft and may be formed before the tube is rolled or they may be formed in the finished shaft in any suitable manner by punching the portions outwardly in the wall of said shaft, as clearly shown in Figures 3 and 4 of the drawings.

In order to avoid the necessity of determining accurately the points at which the projections should be located in order to eliminate unnecessary vibration of said steering shaft these projections are arranged spirally about the outer periphery of the throttle operating shaft. By this arrangement the projections are not only in contact with the steering post on all sides thereof but they are also in contact with said post at short intervals along the length thereof and consequently the vibration of the same is limited very materially if not eliminated entirely.

By making the projections 22 integral with the shaft 16 they will not become displaced and, moreover, they will not interfere with the asembly or operation of the different members of the steering column assembly.

In the modified form of the device shown in Figures 5 and 6 the steering shaft 14$^a$ which is mounted in the steering column 13$^a$ is indented to form the projections 22$^a$ which may be arranged in a manner similar to the projections 22 in Figures 2 and 3. These projections are adapted to contact the shaft 16$^a$ to prevent unnecessary vibration of the steering post. While in this form, as well as in the form shown in Figures 1 to 4, the projections are on only one of the members, it is understood that the invention is not so limited as the projections may be formed on any or all of the tubes, to prevent vibration or rattling of the various members of the steering post assembly, if desired.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

What I claim is:

1. In a device of the class described, a steering column assembly including a tubular member, a steering post associated with said member, projections on said member for engaging said steering post for limiting the vibration thereof.

2. In a steering column assembly, a steering post member, a member associated with and extending along said steering post member, one of said members being provided with projections for engaging the other member at intervals along the length thereof.

3. In a steering column assembly, a steering post, a tubular member associated with said post, and spirally arranged projections on said member to engage said post for limiting the vibration thereof.

4. In a steering column assembly a hollow steering post, a member extending longitudinally of, and within said post, said member provided with projections for engaging along the inner periphery of said post for limiting the vibration thereof.

5. In a steering post assembly, a steering column, a tubular steering post within said column, an operating shaft within said post, and outwardly extending integral projections punched in said shaft and arranged spirally about the same, for engaging said post for limiting the vibration thereof.

6. In a steering column assembly, a hollow steering shaft, a member associated with and extending along said shaft, and projections on said shaft for engaging said member to limit the vibration of said shaft.

In testimony whereof I affix my signature.

HARRY M. DENYES.